(12) United States Patent
Golgiri et al.

(10) Patent No.: US 11,370,392 B2
(45) Date of Patent: Jun. 28, 2022

(54) AUTHENTICATION PIN COLLISION PREVENTION FOR AUTONOMOUS VEHICLES

(71) Applicant: Ford Global Technologies, LLC, Dearborn, MI (US)

(72) Inventors: Hamid M. Golgiri, Livonia, MI (US); Ali Hassani, Ann Arbor, MI (US); Ryan Edwin Hanson, Livonia, MI (US); Howard Paul Tsvi Linden, Southfield, MI (US); Daniel M. King, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 16/752,597

(22) Filed: Jan. 24, 2020

(65) Prior Publication Data
US 2021/0229631 A1 Jul. 29, 2021

(51) Int. Cl.
*B60R 25/24* (2013.01)
*B60W 60/00* (2020.01)
*B60R 25/23* (2013.01)
*H04L 9/32* (2006.01)

(52) U.S. Cl.
CPC ............ *B60R 25/241* (2013.01); *B60R 25/23* (2013.01); *B60R 25/248* (2013.01); *B60W 60/00253* (2020.02); *H04L 9/3236* (2013.01)

(58) Field of Classification Search
CPC ....... B60R 25/41; B60R 25/23; B60R 25/248; B60W 60/00253; H04L 9/3236
USPC .................................................... 340/426.14
See application file for complete search history.

(56) References Cited

U.S. PATENT DOCUMENTS

| 8,607,070 | B2 | 12/2013 | Chen et al. |
| 9,350,548 | B2 | 5/2016 | Bagley |
| 9,875,589 | B1 | 1/2018 | Buttolo et al. |
| 9,963,106 | B1 | 5/2018 | Ricci |
| 10,075,298 | B2 | 9/2018 | Struttmann |
| 2015/0186661 | A1* | 7/2015 | Hirase ............... G06F 21/32 726/28 |

(Continued)

OTHER PUBLICATIONS

"Eliminating PII from Third-Party Authentication", https://edx.readthedo cs.io/projects/edx-installing-configuring-and-running/en/latest/configuration/tpa/tpa_eliminating_pii.html, 6 pages, edX Inc., copyright 2020.

*Primary Examiner* — Jack K Wang
(74) *Attorney, Agent, or Firm* — Frank Lollo; Eversheds Sutherland (US) LLP

(57) ABSTRACT

A vehicle ridesharing system includes a user interface used to interact with rideshare passengers. The interface matches a selected user identifier with a PIN index and sends the PIN index to a vehicle body control module (BCM) of the vehicle through an unsecure communication channel. The BCM uses the PIN index to select a salt value and a nonce associated with a unique user associated with the PIN index, and sends a salt and a nonce back to the interface through the unsecure channel. The user enters a PIN value into the interface to authenticate their identity for the rideshare service. The interface generates a first hash result by hashing the PIN value with the salt and the nonce received from the BCM, and sends the hashed result back to the BCM for authentication.

20 Claims, 4 Drawing Sheets

(56) References Cited

U.S. PATENT DOCUMENTS

| | | | |
|---|---|---|---|
| 2015/0349960 A1* | 12/2015 | Bagley | H04L 9/3228 713/168 |
| 2020/0254974 A1* | 8/2020 | Gordon | G07C 9/00309 |

* cited by examiner

AUTHENTICATION PIN COLLISION PREVENTION FOR AUTONOMOUS VEHICLES

TECHNICAL FIELD

The present disclosure relates to autonomous vehicle authentication, and more particularly, to pin collision avoidance for autonomous vehicle systems.

BACKGROUND

In a vehicle ride sharing system, a user may have the option of entering a vehicle by typing in a personal identification number (PIN) on an interface associated with a vehicle. The user interface may be included as part of a Door Access Panel (DAP) interface, a wireless keypad, mobile device, or other interface. In rides with multiple rideshare users entering at the vehicle at the same pickup location (such as pooled rides), PIN collisions can arise when two or more users use the same PIN to enter the vehicle. With multiple active PINs, there is no way to distinguish two parties with the same PIN, and thus the vehicle does not know when all parties have arrived at the vehicle, and when it is okay to begin moving. When the AV control system is unclear as to which unique riders have entered the vehicle, it may cause undue delay as the vehicle waits for the additional expected rideshare user to enter.

U.S. Pat. No. 9,963,106 (hereafter "the '106 Publication"), assigned to NIO USA, Inc. discloses an autonomous vehicle user authentication system. The '106 Publication describes single or multi-factor AV authentication that uses a generated or derived credential. The time-limited key is transferred to the rider(s) for authenticating that user with the vehicle system. Conventional systems, such as described in the '106 Publication may not reduce the time needed to secure an authentication while providing ease of use and convenience to the rideshare customer using a hashed PIN index authenticated at the body control module rather then passed between vehicle systems.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to a vehicle system for authenticating rideshare and other users. The vehicle may be an autonomous vehicle, partially autonomous vehicle, or a manually driven vehicle. The system can include an interface with which a rideshare passenger (or user) may input identification credentials and receive information from the system. In one aspect, the interface may be or include a DAP disposed on a vehicle door, that includes an interface device from which the user can interact with the system by selecting their unique identifier from a list, and by entering personal identification numbers (PINs) and other non-personally identifying information. In some embodiments, the interface may be a mobile device, a keypad, a wireless or wired input device, a vehicle infotainment system, and/or the like. Accordingly, it should be appreciated that, although a DAP is described with respect to embodiments herein, the interface may alternatively be one or more other types of interfaces described above.

The interface may include a processor that can match a user-selected user identifier to a PIN index associated with that particular identifier, and send the PIN index to a vehicle body control module (BCM) of the vehicle through an unsecure communication channel. The BCM may use the PIN index to select a salt value and a nonce associated with a unique user associated with the PIN index, and send the salt and nonce back to the interface through the unsecure channel. By selecting the salt and nonce based on the PIN index, the BCM does not have to create hash values for all possible user PIN values stored in a secure memory of the BCM. The user may enter their unique PIN value into the interface to authenticate their identity for the rideshare service. The interface may then generate a first hash result by hashing the PIN value with the salt and the nonce received from the BCM, and sending the hashed result back to the BCM for final authentication. System and methods described in the present disclosure may provide encryption and ease of use for rideshare customers while reducing or eliminating the delay normally associated with identifier encryption and authentication. These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
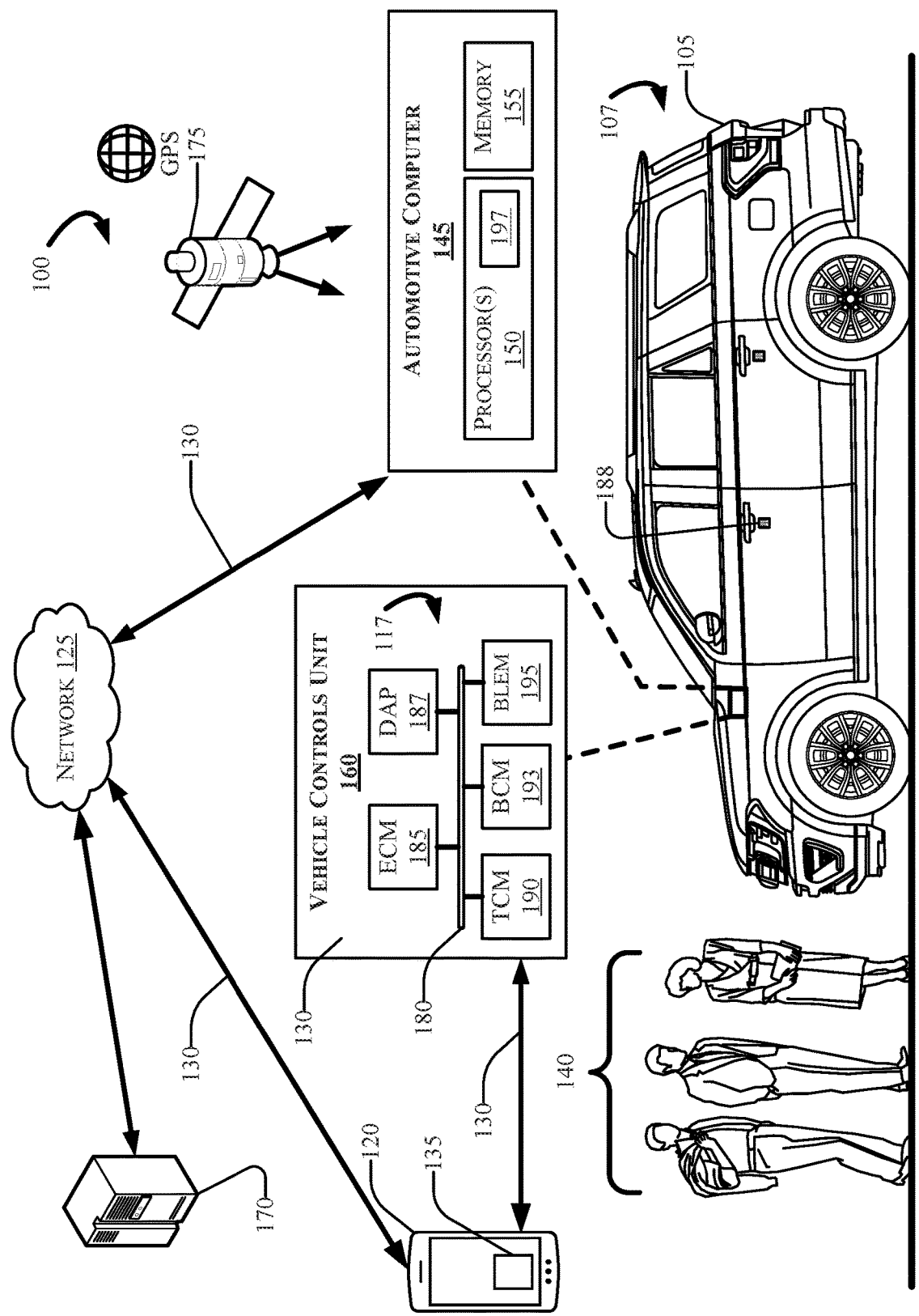
FIG. 1 depicts an example computing environment in which techniques and structures for providing the systems and methods disclosed herein may be implemented.

FIG. 1 depicts an example computing environment 100 that can include a vehicle 105, an automotive computer 145, a Vehicle Controls Unit (VCU) 160, and a mobile device 120. The mobile device 120 may be communicatively coupled with the vehicle 105 via one or more network(s) 125, which may communicate via one or more wireless channel(s) 130. The mobile device 120 may include one or more application(s) 135. In one example embodiment, rideshare users 140 (hereafter referred to in as "the user 140") may interact with a PIN collision avoidance system 107 (hereafter "system 107").

The vehicle 105 may include the system 107 to authenticate rideshare and other users such as the user 140. The vehicle 105 may further include an automotive computer 145, having one or more processor(s) 150 and memory 155. The vehicle 105 may include the VCU 160, which may be disposed in communication with and/or be a part of the automotive computer 145. The VCU 160 may, in some example embodiments, be disposed in communication with the mobile device 120, one or more server(s) 170, which may be associated with and/or include a Telematics Service Delivery Network (SDN). The vehicle 105 may also receive and/or be in communication with a Global Positioning System (GPS) 175.

Although illustrated as a sport utility, the vehicle 105 may take the form of another passenger or commercial automobile such as, for example, a car, a truck, a sport utility, a crossover vehicle, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, the PIN collision avoidance system 107 may be configured to operate with a vehicle having a Level-x or Level-x autonomous vehicle controller. Accordingly, the PIN collision avoidance system 107 may provide some aspects of human control to the vehicle 105, when the vehicle is configured as an AV.

According to an example embodiment, the user 140 may control the one or more application(s) 135 operating on the mobile device 120 to arrange the rideshare, enter a PIN number or other identifying information, and/or perform other aspects of control and interaction with the system 107.

In some aspects, the mobile device 120 may communicate with the vehicle 105 through the one or more wireless channel(s) 130, which may be encrypted and established between the mobile device 120 and a Telematics Control Unit (TCU) and/or a Bluetooth Low-Energy Module (BLEM) 195. The mobile device 120 may communicate with the VCU 160 using a wireless transmitter (not shown in FIG. 1) associated with the VCU 160 on the vehicle 105. The transmitter may communicate with the mobile device 120 using a wireless communication network such as, for example, the one or more network(s) 125. The wireless channel(s) 130 are depicted in FIG. 1 as communicating via the one or more network(s) 125. The VCU 160 can be configured to provide vehicle connectivity to wireless computing systems onboard and offboard the vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU may be disposed in communication with the ECUs 117 by way of a bus 180. In some aspects, the TCU may retrieve data and send data as a node in a CAN bus. The one or more network(s) 125 illustrate an example of one possible communication infrastructure in which the connected devices may communicate. The one or more network(s) 125 may be and/or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The VCU 160 may provide a software and hardware infrastructure for performing aspects of the present disclosure. For example, the VCU 160 can provide communication and control access for two or more Electronic Control Units (ECUs) 117 using a Controller Area Network (CAN) bus 180.

The CAN bus 180 may be configured as a multi-master serial bus standard for connecting two ECUs as nodes using a message-based protocol that can be configured and/or programmed to allow the ECUs 117 to communicate with each other in applications. The CAN bus 180 may be or include a high speed CAN (which may have bit speeds up to 1 Mb/s on CAN, 5 Mb/s on CAN Flexible Data Rate (CAN FD)), and can include a low speed or fault tolerant CAN (up to 125 Kbps), which may use a linear bus configuration. In some aspects, the ECUs may communicate with a host computer (e.g., the automotive computer 145 and/or the server(s) 170, etc.), and may also communicate with one another without the necessity of a host computer. The CAN bus 180 may connect the ECUs 117 with the automotive computer 145 such that the automotive computer 145 may retrieve information from, send information to, and otherwise interact with the ECUs 117 to perform steps described according to embodiments of the present disclosure. The CAN bus 180 may connect CAN bus nodes (e.g., the ECUs 117) to each other through a two-wire bus, which may be a twisted pair having a nominal characteristic impedance.

The ECUs 117, when configured as nodes in the CAN bus 180, may each include a central processing unit, a CAN controller, and a transceiver (not shown in FIG. 1). In an example embodiment, the ECUs 117 associated with the VCU 160 can include an Engine Control Module (ECM) 185, a DAP controller 187, a Transmission Control Module (TCM) 190, a Body Control Module (BCM) 193, and/or the BLEM 195. In some aspects, the VCU 160 may control aspects of the vehicle 105 through the control modules 185, 187, 190, 193, 195, etc., and implement one or more instruction sets received from the application(s) 135 operating on the mobile device 120.

The BCM 193 is a processor-based power distribution center that can supervise and control functions related to the car body such as lights, windows, security, door locks and access control, and various comfort controls. The BCM 193 may also operate as a gateway for bus and network interfaces to interact with remote electronic control units (ECUs) for other systems. The ECUs 117 may control various loads directly via the CAN bus 180 communication or BCM 193.

The BCM 193 generally includes integration of sensors, vehicle performance indicators, and variable reactors associated with vehicle systems. The BCM 193 may coordinate a wide range of vehicle functionality and systems, including energy management systems, alarms, vehicle immobilizers, driver and rider access authorization systems, Phone-as-a-Key (PaaK) systems, driver assistance systems, AV control systems, power feature systems (e.g., windows, doors, actuators, etc.) and other functionality. The BCM 193 may be configured for vehicle energy management, exterior lighting control, wiper functionality, heating ventilation and air conditioning systems, and driver integration systems. In other aspects, the BCM 193 may control auxiliary equipment functionality, and/or be responsible for integration of such functionality with vehicle sub-systems (not shown in FIG. 1).

According to embodiments of the present disclosure, the BCM 193 may be operatively connected with the interface controller 187. The interface controller 187 may include a processor (not shown in FIG. 1) a computer-readable memory (not shown in FIG. 1), and a door access panel input/output device (described hereafter as the "interface device 188"). According to embodiments of the present disclosure, the interface device 188 may include a display that can receive user touch input, such as a touch screen or other mechanism. In other aspects, the interface device 188 may provide display output generated by the interface controller 187, including a list of user identifiers, a menu, an alpha-numeric keypad, a menu of selectable icons, a menu of selectable photographs, etc. The interface controller 187 may also be disposed in communication with the automotive computer 145, and may transmit information to an authentication manager 197 configured to coordinate command instructions to the VCU 160 for providing vehicle access, navigational access, AV systems control, etc.

The interface controller 187 may provide access authorization for the user 140, using, at least in part, user inputs that can include PIN numbers, personally-identifiable information such as name, address information, birth date, and other information, and non-personally identifiable information. Non-personally identifiable information may include information that, when observed by an individual without personal knowledge of any association between the identifier and an individual, appears to be unconnected to any particular person. It may include a non-identifiable user ID, a number, a nonsensical phrase or word, an icon, a photo, or some other identifier. As used herein, a user identifier may be considered non-personally identifiable such that a user may remain anonymous while such identifier is presented on a vehicle exterior surface viewable by other observers.

The ECUs 117 are described for exemplary purposes only, and are not intended to be limiting or exclusive. Control and/or communication with other control modules not shown in FIG. 1 is possible, and such control is contemplated. For example, although discussed as a functionality of the automotive computer 145, it should be appreciated that the authentication manager 197 may be a part or functionality controlled with the BCM or the other ECUs 117 described herein.

The automotive computer 145 may include one or more processor(s) 150 and a computer-readable memory 155. The automotive computer 145 may be installed in an engine compartment of the vehicle 105 (or elsewhere in the vehicle 105) as part of the PIN collision avoidance system 107 in accordance with the disclosure. The automotive computer 145 may include, in one example, the one or more processor(s) 150, and a computer-readable memory 155. In other example embodiments, the VCU 160 may be integrated with and/or be incorporated with the automotive computer 145. The computing system architecture of the automotive computer 145 may omit certain computing modules. It should be readily understood that the computing environment depicted in FIG. 1 is one example of a possible implementation according to the present disclosure, and thus, it should not to be considered limiting or exclusive.

The one or more processor(s) 150 may be disposed in communication with one or more memory devices (e.g., the memory 155 and/or one or more external databases (not shown in FIG. 1). The one or more processor(s) 150 may utilize the memory 155 to store programs in code and/or to store data for providing AV access using the system 107 in accordance with the disclosure. The memory 155 may be a non-transitory computer-readable memory. The processor(s) 150 may be configured to execute computer-executable instructions stored in the memory 155 for performing various functions of the system 107 as well as for performing vehicle control capabilities in accordance with the disclosure. Consequently, the memory 155 may be used for storing code and/or data code and/or data for performing operations in accordance with the disclosure.

The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. In another exemplary implementation, some or all components of the automotive computer 145 may be shared with the VCU 160.

The memory 155 may store various code modules such as, for example, a secure communication controller (not shown in FIG. 1) for establishing the one or more wireless channels 130 (which may, in some embodiments, be encrypted channel(s)) between the mobile device 120, the VCU 160, and/or the automotive computer 145. The memory 155 may also receive the one or more instruction sets for providing vehicle access to rideshare customers (e.g., the user 140). The instruction sets may include encryption keys, stored PINs, hash results, PIN indices, user profiles associated with one or more users (e.g., the user 140), etc.

Figure 2:
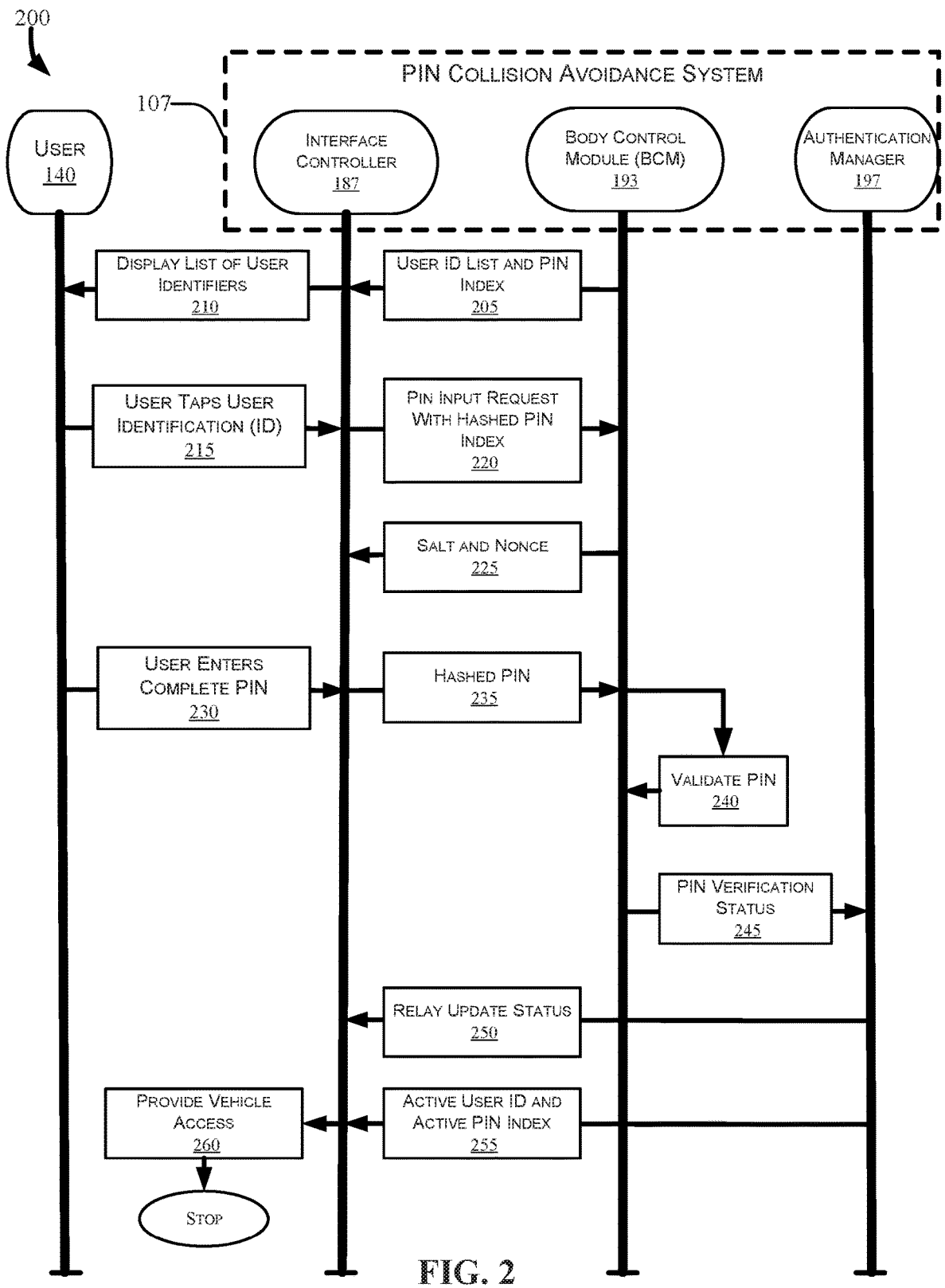
FIG. 2 illustrates a flow diagram of an exemplary embodiment for providing vehicle access using pin collision prevention system in accordance with the present disclosure.

FIG. 2 illustrates a flow diagram of an exemplary method 200 embodiment for providing vehicle access using the PIN collision avoidance system 107, in accordance with the present disclosure. FIG. 2 may be considered in conjunction with FIG. 1.

According to one embodiment, the system 107 can include, at least in part, the interface controller 187, the BCM 193, and the authentication manager 197. The vehicle 105 (as depicted in FIG. 1) may be part of a rideshare program associate that uses a rideshare platform delivered by the server(s) 170. During a registration process, rideshare users (e.g., the user 140) may create and/or accept an identifier that associates that user with a particular payment account, a user profile, a set of preferences, address information, time information, location information, user preferences, etc. The server(s) 170 may store such information and provide the information to one or more vehicles (e.g., the vehicle 105) via the wireless channel(s) 130, which may operate as part of a rideshare vehicle fleet (fleet not shown in FIGS. 1 and 2).

When the user 140 requests a rideshare, an indication of the user identifier and rideshare information indicating the desired route, pickup time, pickup location, etc., may be sent to the vehicle 105. Accordingly, the server(s) 170 may group geographically-associated users together (co-users of a same rideshare, for example) and generate a list of user identifiers from a control platform (not shown in FIG. 1 or 2) used to assist users in generating a user profile based on such a group. The server(s) 170 may associate one or more user identifiers with user personal information, payment information, and other aspects of registration of the user 140 with a rideshare program, aggregate a plurality of user identifiers associated with a particular vehicle (e.g., the vehicle 105), and transmit the user identifiers and other information to the BCM 193 via the wireless channel(s) 130. In one aspect, the BCM 193 may receive the information from the server(s) 170, and store the information onboard the vehicle 105 in a computer-readable memory of the BCM 193. The interface controller 187 may output the user identifier list via the interface device 188 located on the vehicle 105 door. It should be appreciated that one or more doors of the vehicle 105 (as shown in FIG. 1) may include an interface device 188 (which, in FIG. 1 is depicted as a DAP 188).

At step 205, the BCM 193 may send a data message comprising the user ID list and a PIN index to the interface controller 187. The PIN index may be a data structure indicative of user identifiers correlated with other authentication information. For example, the PIN index may be and/or include a table, where a row is associated with a particular user identifier, and columns of the PIN index include aspects of user identification information.

The method may further includes preliminary steps of determining that the user 140 requests access to the vehicle 105 (not shown in FIG. 4), via a sensory input or a user input. This preliminary step may include determining, using one or more vehicle systems, that the user 140 is proximate the vehicle 105 and ready to enter the vehicle 105 and/or otherwise engage the rideshare. For example, the user 140 may enable and/or activate the system 107 by pressing a "let me in the vehicle" button on the interface device 188 (as depicted in FIG. 1), or another activating user input.

After determining that the user 140 is proximate the vehicle 105, at step 210 the interface controller 187 may display the list of user identifiers. The user 140 may scroll and/or otherwise navigate the list and select their user identifier among the one or more possible user identifiers.

At step 210, the interface controller 187 may output a display indicative of a list of user identifiers. The user identifiers may be words, signs, symbols, images, names, etc. User identifier information may be received from the server(s) 170 via the interface device 188. The list may be displayed via a scrolling mechanism, a menu selection mechanism, or by using another user interface methodology known in the art.

At step 215, the user 140 can tap, select, or otherwise indicate their selection of their individual identifier from the list of identifiers. It should be appreciated that the list of identifiers may have as few as one user identifier (associated with the user 140), and may have any number of identifiers listed. Accordingly, the interface controller 187 may receive the user selection, and save the selection to a computer memory.

At step 220, the interface controller 187 may identify a match between the user identifier entered or selected by the user 140, and transmit a personal identification number (PIN) index associated with that user. The interface controller 187 may send a request message to the BCM 193 that includes a request for a salt value and a nonce associated with the unique user that provided the identifier selection at step 215. The Interface controller 187 may send the request, which may include a message instructing the BCM to generate or fetch a salt encryption value and nonce value, and return the salt value and nonce value to the interface controller 187. This step tells the BCM 193 specifically which key index is to be considered for authentication such that the BCM does not have to generate hash values for all possible PIN codes associated with the vehicle 105 at each request. While conventional systems may evaluate multiple key indices responsive to a decryption request, it should be appreciated that delays associated with conventional systems may be mitigated using techniques and systems described herein. The system 107 may cause the BCM, responsive to the encryption key index and the request, to hash a particular PIN stored on the BCM memory instead of hashing a larger volume of numbers. Accordingly, the system 107 may mitigate time loss due to encryption/decryption inefficiencies.

At step 225, the BCM 193 may respond by transmitting the salt and nonce value to the interface controller 187. The DAP controller may store the salt value and the nonce value to a computer memory associated with the interface controller 187.

At step 230 the interface controller 187 may receive input indicative of a complete PIN entry. For example, the user 140 may, in response to an output requesting such PIN entry, enter their PIN using the interface device 188. Although depicted in FIG. 2 as sequentially occurring after prior steps 215-225, it should be appreciated that the step 230 may conclude during or before any of the steps 220-225.

At step 235 the interface controller 187 may receive the user PIN, and use the salt value and the nonce value to generate a hashed PIN message that hashes the PIN using the salt received from the BCM 193.

At step 240 the BCM 193 may compare the hashed PIN to a local (and secure) hash result of the stored PIN local to the BCM, and determine whether the hashed PIN is valid. In one example embodiment, the BCM may generate a new hash value responsive to receiving the request from the interface controller 187. In another example embodiment, the BCM 193 may generate and store hashed PIN values in advance of receiving the hashed PIN from the interface controller 187.

Responsive to determine that the hashed PIN is valid, at step 245 the BCM 193 may transmit a PIN verification status to the authentication manager 197. The PIN verification status may provide an indication that the verified and authenticated user associated with the hashed PIN value has entered (or such entry is imminent).

At steps 250 and 255 (which may be simultaneous or sequential in any order) the authentication manager 197 may relay an update status 250 to the interface controller 187 and relay an active user ID and active PIN index 255 to the DAP 255.

At step 260, responsive to receiving the update status from the authentication manager, the interface controller 187 may provide the vehicle access by unlocking a door, beginning the ride, and performing other aspects associated with the rideshare.

In another embodiment, the system 107 may further reduce latency by sending the PIN index to the BCM 193 directly, and the BCM 193, in response, returns a pre-generated nonce and a pre-generated hash value. For example, the BCM 193 may receive the PIN index associated with the encryption key and the salt value request (as in step 220) and transmit a pre-generated salt value and a nonce value to the interface controller 187 responsive to the salt value request. The pre-generated value(s) may be stored in the BCM 193 memory. Accordingly, the BCM 193 may fetch, from the computer memory of the BCM, a BCM-stored PIN value associated with the user identifier. According to the present embodiment, the BCM 193 may generate its own hash result using the salt value, the nonce, and the BCM-stored PIN value. The BCM 193 may transmit the BCM-generated hash value to the interface controller 187 directly, and the interface controller 187 determines whether the hash results match. According to the present embodiment, the interface controller 187 may provide the vehicle access based on determining that the BCM-generated hash result matches the DAP-generated hash result.

This alternative embodiment process may save time during the authentication process by avoiding the round trip and calculation times associated with performing a calculation at the BCM 193 responsive to a request. After the access is granted, a new pre-generated hash value may be generated by the BCM 193 and stored for in BCM memory for the next transaction.

Figure 3C:
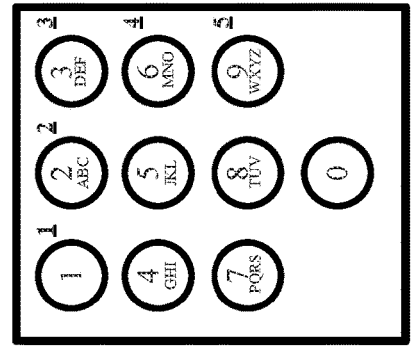
FIGS. 3A-3E depict example PIN key selections in accordance with the present disclosure.
Figure 3B:
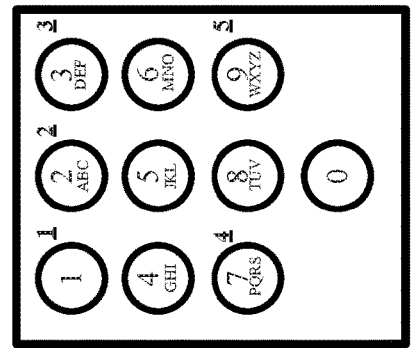
Figure 3E:
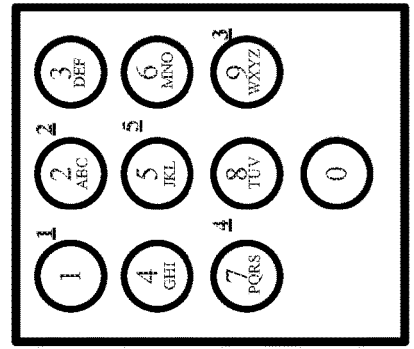
Figure 3A:
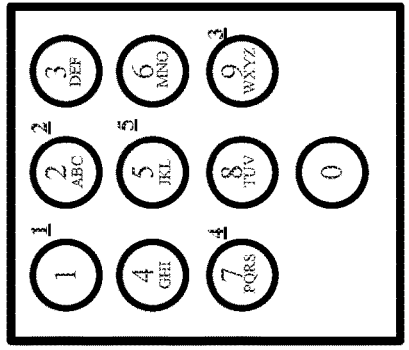
Figure 3D:
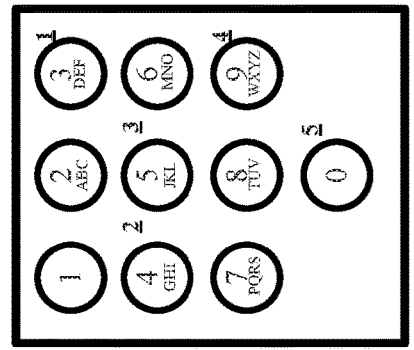

FIGS. 3A-3E depict example PIN key selections in accordance with the present disclosure. The system 107 may also further mitigate PIN collisions without affecting vehicle 105 or cloud architecture by recommending or requiring particular PINs at the time the user creates the PIN value. For example, as shown in FIG. 3A, PIN values with orthogonally adjacent digits in a row may be avoided by requesting or requiring that the user avoid such PIN number patterns. FIG. 3A shows the PIN 1-2-3-6-9, which includes all adjacent number entries. Such a pattern may be deemed unacceptable, at least according to one embodiment. In another embodiment, the system 107 may accept such a pattern, but recommend to the user 140 that the pattern be changed for security and delay mitigation reasons. Such a recommendation may include displaying, via the display output device, a warning or message, and receiving an alternative PIN assignment via user input.

In another example shown in FIG. 3B, the orthogonally adjacent digits 1-2-3- shown, which may also not be accepted by the system 107. But FIG. 3C depicts the pattern 1-2-5-4-9, which includes no adjacent digits (and thus, may be deemed acceptable or preferred over the patterns of FIGS. 3A and 3B). Such a pattern may be preferred, because it does not include contiguous digits that are prone to hash collisions. Similarly, the patterns of FIGS. 3D and 3E include, respectively, contiguous digits that are adjacent and may be prone to create PIN collisions (or hash collisions when the PIN values are hashed).

Figure 4:
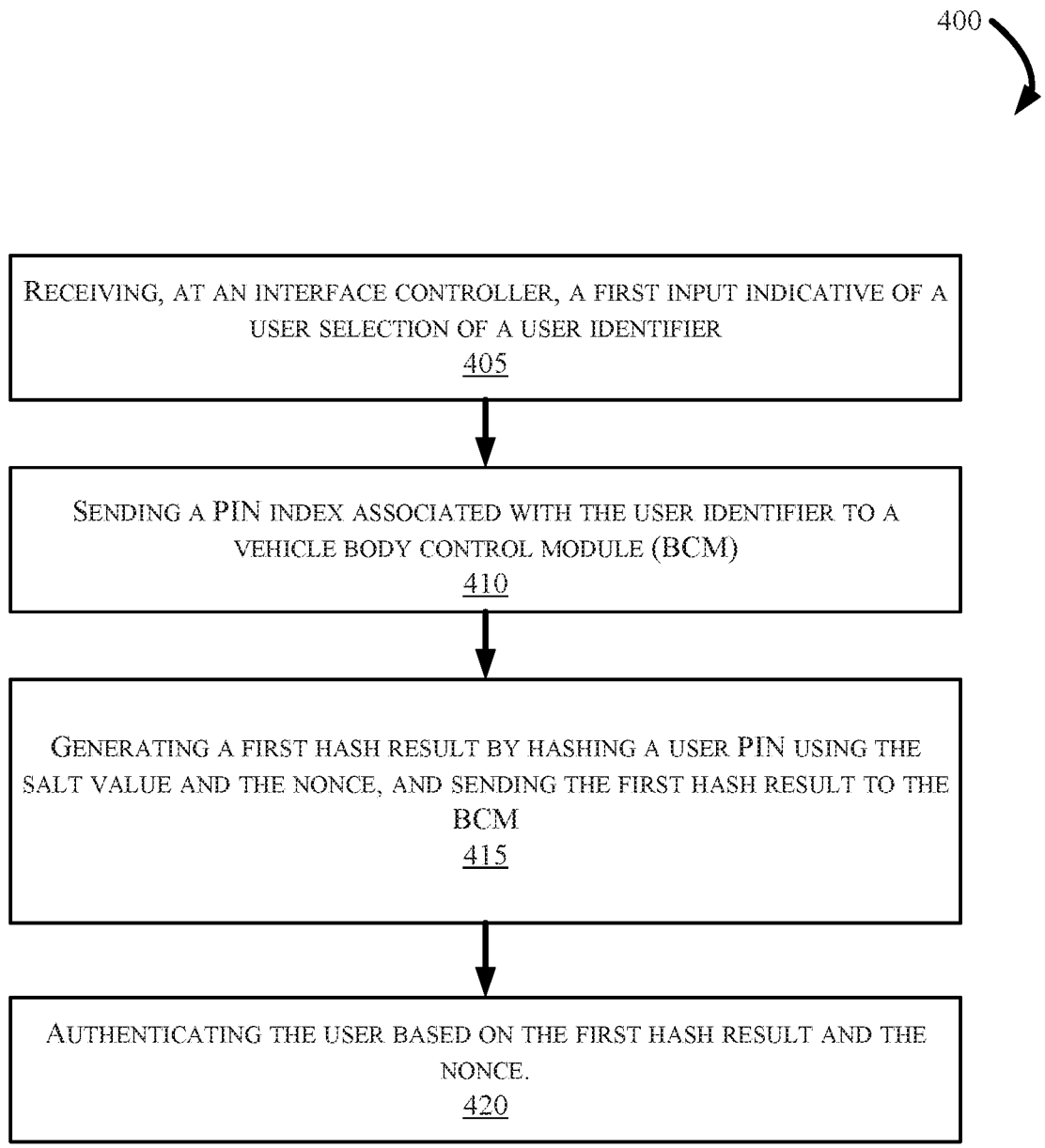
FIG. 4 depicts an example flow diagram in accordance with the present disclosure.

FIG. 4 is a flow diagram of an example method 400 for providing vehicle access using the system 107 in accordance with the present disclosure. As shown in step 405, the method 400 may commence with receiving, at the interface controller 187, a user selection of a user identifier associated with the user 140. This aspect can be performed by determining that the user 140 requests the vehicle 105 access, and responsive to the user request for vehicle access, fetching a list of identifiers (not shown in FIGS. 1-3) comprising the user identifier via the interface controller 187. The DAP may display the list on an interface device associated with the DAP controller, and receive the user selection of the user identifier.

Next, the method includes a step 410 of sending a PIN index associated with the user identifier to a vehicle body control module (BCM). This process can be performed using the processor of the interface controller 185 by, responsive to receiving the user identifier.

At step 415, the method 500 may further include generating a first hash result by hashing a user PIN using the salt value and the nonce, and sending the first hash result to the BCM. The BCM may generate a second hash result responsive to receiving the first hash result from the interface controller 185.

At step 420, the method includes the step of authenticating the user based on the first hash result. The authenticating may include steps such as determining the first hash result matches a second hash result generated by the BCM by performing a comparison of the two values, and authenticating the user responsive to determining that the first hash result matches the second hash result generated by the BCM.

The BCM may perform the matching operation in various ways. In one embodiment, the BCM may perform steps including receiving a second input of a user PIN, and fetching a user PIN record from a secure memory of the BCM. In one aspect, the user PIN record may include an expected user PIN associated with the user, where the PIN was generated during a setup operation and saved to the vehicle BCM. The steps may further include generating, via the BCM, a second hash result by hashing the user PIN record using the salt value and the nonce, and determining, via the BCM, that the first hash result matches the second hash result.

In another aspect, the BCM may perform steps in a preemptive way to save time when the request is made by the interface controller. For example, the steps may include, prior to receiving the first hash result, generating the second hash result at the BCM, and storing the second hash result in a secure memory of the BCM. Then responsive to determining, via the BCM, that the first hash result matches the second hash result, the steps could include sending a status message from the BCM indicative that the user is validated for a rideshare. Accordingly, the PIN collision avoidance system may reduce the time needed to secure an authentication while providing ease of use and convenience to the rideshare customer using a hashed PIN index authenticated at the body control module rather then passed between vehicle systems.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for authenticating a user in a vehicle, comprising:
   receiving, at an interface, a first input indicative of a user selection of a user identifier;
   sending a PIN index associated with the user identifier to a vehicle body control module (BCM);
   receiving, responsive to sending the PIN index, a salt value and a nonce associated with the PIN index;
   generating a first hash result by hashing a user PIN using the salt value and the nonce, and sending the first hash result to the BCM;
   determining that the first hash result matches a second hash result generated by the BCM based at least in part on a copy of the user PIN stored at the BCM; and
   authenticating the user based on the first hash result.

2. The method according to claim 1, wherein the BCM generates the second hash result responsive to receiving the first hash result.

3. The method of claim 2, further comprising:
   authenticating the user responsive to determining that the first hash result matches the second hash result generated by the BCM.

4. The method according to claim 2, further comprising:
   prior to receiving the first hash result, receiving, from a cloud server, the copy of the user PIN stored at the BCM;
   generating the second hash result using the salt value at the BCM based on the copy of the user PIN stored at the BCM; and
   storing the second hash result in a secure memory of the BCM.

5. The method according to claim 1, wherein the BCM is configured for:
   receiving a second input of a user PIN;
   fetching a user PIN record from a secure memory of the BCM, the user PIN record comprising an expected user PIN associated with the user generated using a setup operation;
   generating, via the BCM, a second hash result by hashing the user PIN record using the salt value and the nonce; and
   determining, via the BCM, that the first hash result matches the second hash result.

6. The method according to claim 1, further comprising:
   responsive to determining, via the BCM, that the first hash result matches the second hash result, sending, via the BCM, a status message to the interface indicative that the user is validated for a rideshare.

7. The method according to claim 1, wherein receiving the first input comprises:

receiving a list of identifiers comprising a user identifier associated with the user, and a personal identification number (PIN) index associated with the user identifier; and presenting the list of identifiers via the interface.

8. A vehicle authentication system, comprising:
a Body Control Module (BCM); and
an interface processor disposed in communication with the BCM; and
an interface memory for storing executable instructions, the interface processor configured to execute the instructions to:
receive a first input indicative of a user selection of a user identifier;
send a PIN index associated with the user identifier to a vehicle body control module (BCM);
receive, responsive to sending the PIN index, a salt value and a nonce associated with the PIN index;
generate a first hash result by hashing a user PIN using the salt value and the nonce, and sending the first hash result to the BCM;
determine that the first hash result matches a second hash result generated by the BCM based at least in part on a copy of the user PIN stored at the BCM; and
authenticate the user based on the first hash result.

9. The system according to claim 8, wherein the BCM is further configured to execute the instructions to:
generate the second hash result responsive to receiving the first hash result.

10. The system according to claim 9, wherein the BCM is further configured to execute the instructions to:
authenticate the user responsive to determining that the first hash result matches the second hash result generated by the BCM.

11. The system according to claim 10, wherein the BCM is further configured to execute the instructions to:
prior to receiving the first hash result, receive, from a cloud server, the copy of the user PIN stored at the BCM;
generate the second hash result using the salt value at the BCM based on the copy of the user PIN stored at the BCM; and
store the second hash result in a secure memory of the BCM.

12. The system according to claim 11, wherein the BCM is further configured to execute the instructions to:
receive a second input of a user PIN;
fetch a user PIN record from a secure memory of the BCM, the user PIN record comprising an expected user PIN associated with the user generated using a setup operation;
generate a second hash result by hashing the user PIN record using the salt value and the nonce; and
determine that the first hash result matches the second hash result.

13. The system according to claim 11, wherein the interface processor is further configured to execute the instructions to:
responsive to determining that the first hash result matches the second hash result, send a status message to the interface indicative that the user is validated for a rideshare.

14. The system according to claim 11, wherein the interface processor is further configured to:
receive the user identifier via an interface device associated with the interface;
receive a user input comprising the user PIN;
determine that the user PIN is acceptable based on a determination that the user PIN does not include two or more spatially orthogonally adjacent digits; and
update the PIN index, the updating comprising associating the user identifier with the user PIN.

15. The system according to claim 11, wherein the interface processor is further configured to:
receive the first input comprising a list of identifiers having a user identifier associated with the user, and a personal identification number (PIN) index associated with the user identifier; and
presenting the list of identifiers via the interface.

16. A non-transitory computer-readable storage medium in a vehicle control system comprising a Door Access Panel (DAP) controller and a body control module (BCM), the computer-readable storage medium having instructions stored thereupon which, when executed by a processor, cause the processor to:
receive a first input indicative of a user selection of a user identifier;
send a PIN index associated with the user identifier to a vehicle body control module (BCM);
receive, responsive to sending the PIN index, a salt value and a nonce associated with the PIN index;
generate a first hash result by hashing a user PIN using the salt value and the nonce, and sending the first hash result to the BCM;
determine that the first hash result matches a second hash result generated by the BCM based at least in part on a copy of the user PIN stored at the BCM; and
authenticate the user based on the first hash result.

17. The non-transitory computer-readable storage medium of claim 16, wherein the BCM is further configured to execute the instructions to:
determine that the first hash result matches the second hash result generated by the BCM; and
responsive to determining, via the BCM, that the first hash result matches the second hash result, sending, via the BCM, a status message to the interface indicative that the user is validated for a rideshare.

18. The non-transitory computer-readable storage medium of claim 17, wherein the BCM is further configured to execute the instructions to:
authenticate the user responsive to determining that the first hash result matches the second hash result generated by the BCM.

19. The non-transitory computer-readable storage medium of claim 17, wherein the BCM is further configured to execute the instructions to:
receive a list of identifiers and a personal identification number (PIN) index associated with the user identifier; and
present the list of identifiers via the interface.

20. A method for establishing a user account for authenticating a user in a vehicle comprising:
receiving a user identifier via an interface device;
receiving a user input comprising a user PIN;
determining that the user PIN is acceptable based on a determination that the user PIN does not include two or more spatially orthogonally adjacent digits; and
updating a PIN index, the updating comprising associating the user identifier with the user PIN.

* * * * *